(12) United States Patent
Yanik et al.

(10) Patent No.: US 11,585,964 B2
(45) Date of Patent: Feb. 21, 2023

(54) ELECTRO-PLASMONIC NANOANTENNA FOR EXTRACELLULAR OPTICAL DETECTION OF ELECTROGENIC SIGNALS

(71) Applicant: The Regents of the University of California, Oakland, CA (US)

(72) Inventors: Ahmet Ali Yanik, Santa Cruz, CA (US); Ahsan Habib, Santa Cruz, CA (US); Xiangchao Zhu, Santa Cruz, CA (US)

(73) Assignee: The Regents of the University of California, Oakland, CA (US)

( * ) Notice: Subject to any disclaimer, the term of this patent is extended or adjusted under 35 U.S.C. 154(b) by 374 days.

(21) Appl. No.: 16/989,266

(22) Filed: Aug. 10, 2020

(65) Prior Publication Data

US 2021/0041607 A1    Feb. 11, 2021

Related U.S. Application Data

(60) Provisional application No. 62/884,735, filed on Aug. 9, 2019.

(51) Int. Cl.
*G02B 5/00* (2006.01)
*H01Q 1/38* (2006.01)
*G01N 21/65* (2006.01)
*H01Q 9/42* (2006.01)

(52) U.S. Cl.
CPC .......... *G02B 5/008* (2013.01); *G01N 21/658* (2013.01); *H01Q 1/38* (2013.01); *H01Q 9/42* (2013.01)

(58) Field of Classification Search
CPC .... G02B 5/008; G01N 21/658; G01N 21/554; H01Q 1/38; H01Q 9/42
USPC ........................................................ 356/301
See application file for complete search history.

(56) References Cited

U.S. PATENT DOCUMENTS

2002/0155661 A1* 10/2002 Massingill .............. H01L 24/96
                                                                    430/311
2019/0146295 A1*  5/2019 Parker ............... B32B 17/10302
                                                                    359/265

\* cited by examiner

*Primary Examiner* — Md M Rahman
(74) *Attorney, Agent, or Firm* — Carter, DeLuca & Farrell LLP

(57) ABSTRACT

An electro-plasmonic array is disclosed. The electro-plasmonic array includes a substrate and a plurality of nanoantennas disposed on a surface of the substrate, each of the electro-plasmonic nanoantennas including a conductive nanodisk and a conforming biocompatible electrochromic polymer layer.

20 Claims, 13 Drawing Sheets

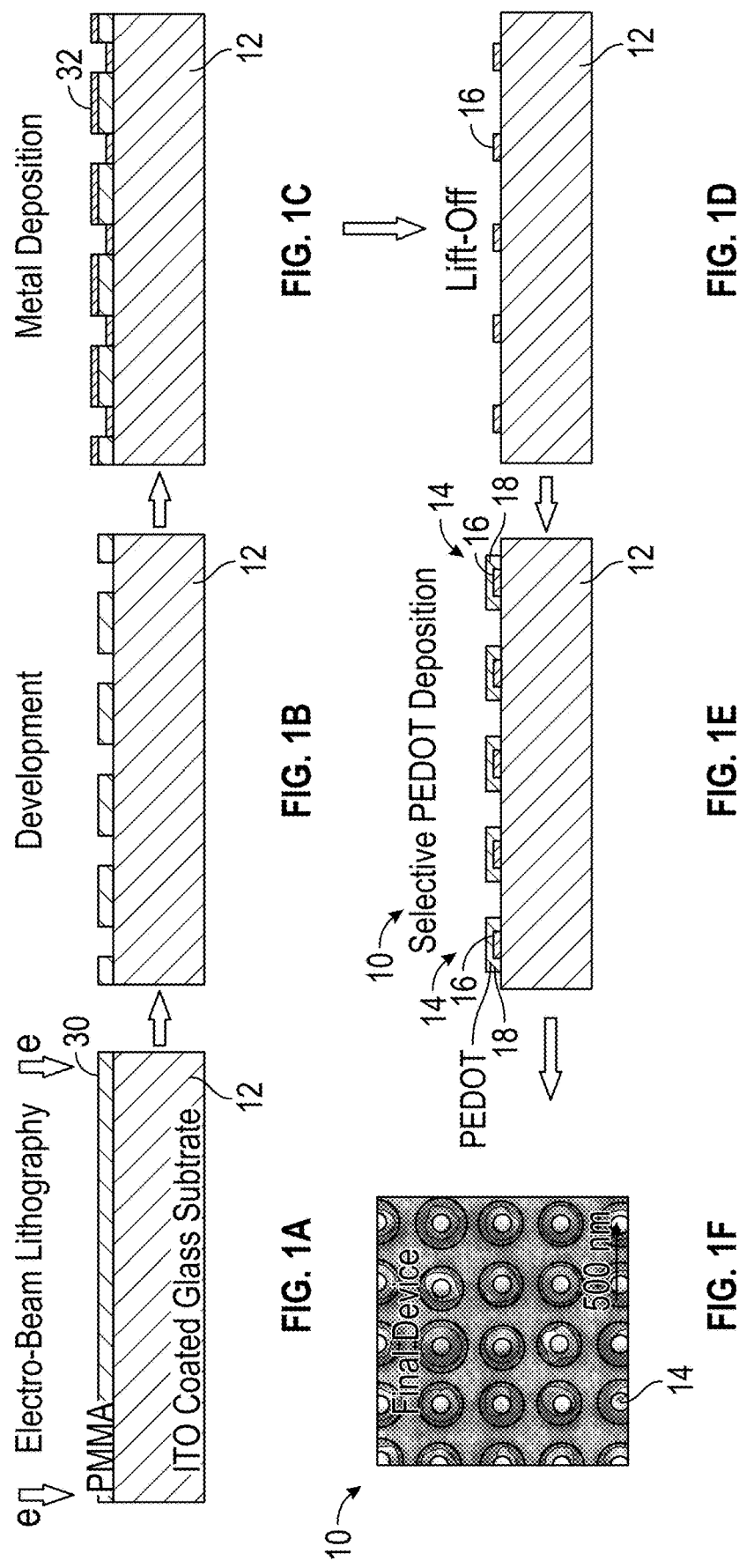

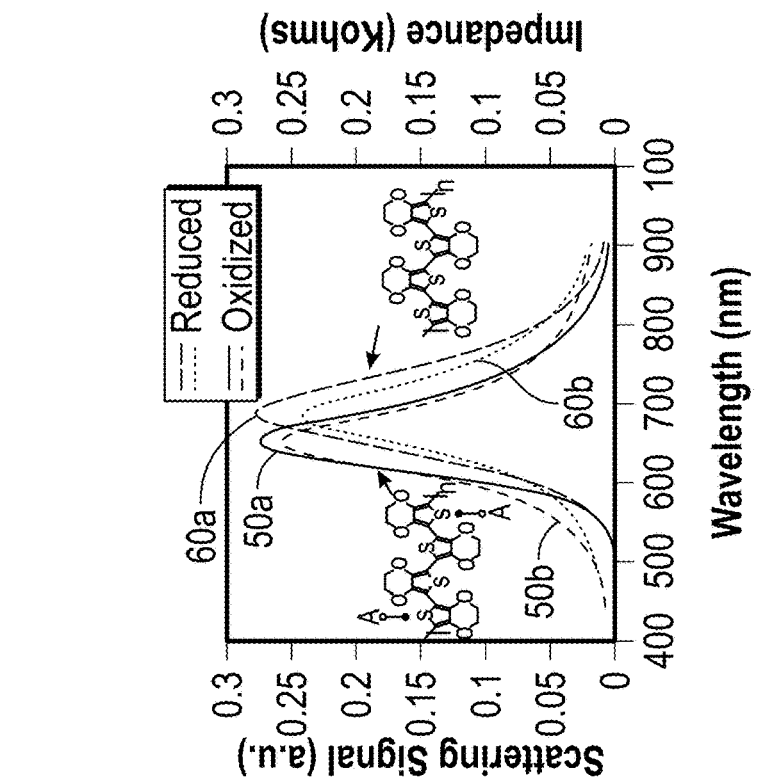
FIG. 2D
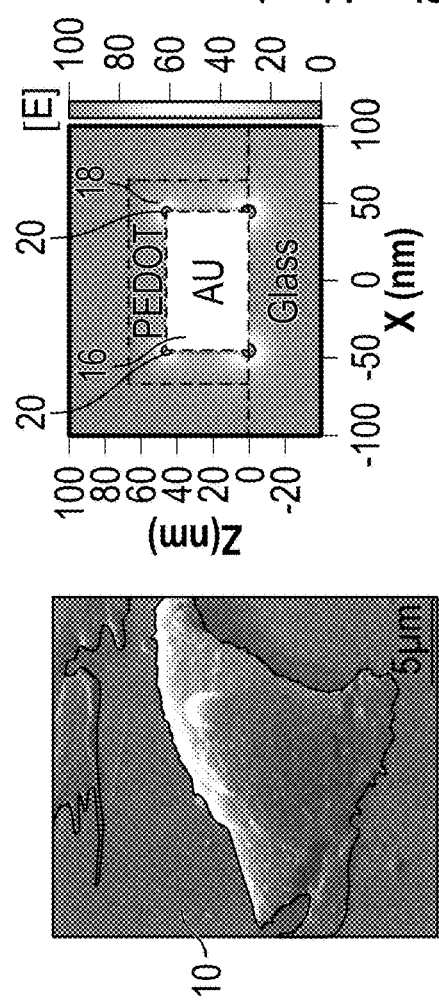
FIG. 2B
FIG. 2C
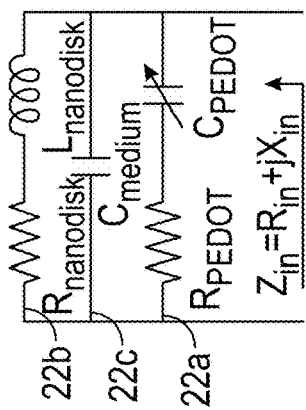
FIG. 2A

114

ELECTRO-PLASMONIC NANOANTENNA FOR EXTRACELLULAR OPTICAL DETECTION OF ELECTROGENIC SIGNALS

CROSS-REFERENCE TO RELATED APPLICATION

This application claims the benefit of and priority to U.S. Patent Provisional Application No. 62/884,735, filed on Aug. 9, 2019. The entire disclosure of the foregoing application is incorporated by reference herein.

GOVERNMENT LICENSE RIGHTS

This invention was made with Government support under Grant No. 1611290, awarded by the National Science Foundation. The Government has certain rights in the invention.

BACKGROUND

Electro-optical translators, which convert electrogenic activity to photonic signals, may be used for optical detection of electric-field dynamics. However, conventional translators lack high signal-to-noise ratio measurement capability due to low photon counts (e.g., voltage sensitive dyes and quantum dots) and/or low electric-field sensitivities (e.g., plasmonic nanoantenna). Plasmonic nanoantennas, which focus light beyond diffraction limit, present a plethora of exciting opportunities for biomedical applications. Strongly enhanced near fields associated to localized surface plasmons (LSPs) facilitate transduction of tiny fluctuations in the local refractive index into readily detectable resonance wavelength shifts in the far-field spectra without near-field optics or physical connections.

Currently, label-free biosensing nanoantenna technologies based on refractive index change are capable of single molecule accumulation on its surface. However, progress towards real-time optical detection of local electric field dynamics, which is highly desirable for recording the electrophysiological activity of excitable cells, remains elusive. During the past decade, there has been a concerted effort to develop plasmonic probes based on inherent electric-field sensitivity of noble metals. However, inherent electric-field sensitivity of metals are low: electro-optic effects in metals are weak due to the high electron densities. Optical measurements based on conventional plasmonic nanoantennas are dominated by the optical shot noise. Accordingly, there is a need for new class of extremely bright non-fluorescent optical probes that can sensitively detect local electric-field dynamics.

SUMMARY

The present disclosure provides electrochromically-loaded plasmonic (electro-plasmonic) nanoantennas, which overcome field sensitivity limitations of conventional electro-optical translators. Electro-plasmonic nanoantennas have about 10-100 million times larger cross sections than fluorescence dyes and provide about $3.25 \times 10^3$ fold enhanced sensitivities than conventional plasmonic nanoantennas. Electro-plasmonic nanoantennas enable optical detection of electric field dynamics from diffraction limited volumes and achieve high-speed measurements with sub-millisecond temporal response times (about 191 µs). Electro-plasmonic nanoantennas provide capability of label-free and real-time optical recording of cellular electrogenic activity at low intensity conditions (about 11 mW/mm2). This allows use of the nanoantennas in optical imaging of electric-field dynamics with high spatiotemporal resolution.

The electro-plasmonic nanoantennas according to the present disclosure may be used as extremely bright non-fluorescent optical probes, which can sensitively detect local electric-field dynamics. The nanoantennas include lumped nanocircuit elements that act as tunable radio frequency (RF) antennas. The nanoantennas include a coating formed from a biocompatible electrochromic polymer, which is used as an electric-field controlled "active" load for progressive and reversible tuning of plasmonic nanoantenna resonances in real-time. Suitable biocompatible electrochromic polymers include, but are not limited to, poly(3,4-thylenedioxythiophene):polystyrene sulfonate (PEDOT:PSS), polypyrrole, polyaniline, poly(3,4-propylenedioxythiophene) (Polypro DOT), combinations and derivatives thereof.

According to one embodiment of the present disclosure, an electro-plasmonic array is disclosed. The electro-plasmonic array includes a substrate and a plurality of nanoantennas disposed on a surface of the substrate, each of the electro-plasmonic nanoantennas including a conductive nanodisk and a conforming biocompatible electrochromic polymer layer.

According to another embodiment of the present disclosure, a method of forming an electro-plasmonic array is disclosed. The method includes: depositing a photoresist layer on a substrate; patterning the photoresist layer to form a two-dimensional matrix pattern; depositing a conductive layer over the patterned photoresist layer; removing the photoresist layer thereby retaining a plurality of conductive nanodisks disposed on a surface of the substrate; and depositing a conforming biocompatible electrochromic polymer layer over the plurality of conductive nanodisks thereby forming a plurality of nanoantennas.

According to one aspect of any of the above embodiments, the substrate is formed from glass and includes a conductive coating. The conductive coating may be an indium tin oxide coating.

According to another aspect of the above embodiments, the substrate may be either conductive or non-conductive. Although a conductive coating or surface may be used to aid in polymerization of the biocompatible electrochromic polymer layer. However, a conductive coating is not necessary for operation of the electro-plasmonic array. Various techniques may be used to enable electrostatic deposition of the biocompatible electrochromic polymer.

According to another aspect of any of the above embodiments, the plurality of nanoantennas are disposed in a two-dimensional matrix pattern with a periodicity of about 500 nm.

According to a further aspect of any of the above embodiments, the plurality of nanoantennas are disposed in a two-dimensional matrix pattern wherein a first distance between the nanoantennas is from about 100 nm to 1000 nm and a second distance is from about 100 nm to about 1000 nm. The first distance and the second distance may be different.

According to one aspect of any of the above embodiments, the conductive nanodisks are formed from a conductive material selected from the group consisting of graphene, gold, silver, aluminum, copper, titanium, magnesium, palladium, and zirconium. The electrochromic polymer layer is selected from the group consisting of poly(3,4-ethylenedioxythiophene): polystyrene sulfonate, polypyrrole, polyaniline, and poly(3,4-propylenedioxythiophene).

According to another aspect of any of the above embodiments, the electrochromic polymer layer has a thickness from about 10 nm to about 50 nm. The conductive nanodisks have a thickness from about 10 nm to about 100 nm and a lateral dimension from about 50 nm to about 200 nm.

BRIEF DESCRIPTION OF DRAWINGS

Various embodiments of the present disclosure will be described herein below with reference to the figures wherein:

FIG. 1A-E illustrate cross-sectional views of a substrate at multiple stages of formation of an array of electrochromically loaded plasmonic nanoantennas according to the present disclosure;

FIG. 1F is a scanning electron microscope (SEM) image of the array of nanoantennas with a scale bar of 500 nm;

FIG. 2A is a SEM of human induced pluripotent stem cell (hiPSC) derived cardiomyocyte (iCM) disposed on the nanoantennas FIG. 1F;

FIG. 2B is finite difference time domain (FDTD) simulation of plasmonic excitation of the nanoantenna of FIG. 1F showing electromagnetic hot spots;

FIG. 2C is a lumped circuit model of the nanoantenna of FIG. 1F;

FIG. 2D shows simulated plots and lumped circuit model plots of doped and de-doped PEDOT:PSS coatings;

DETAILED DESCRIPTION

Figure 3A:
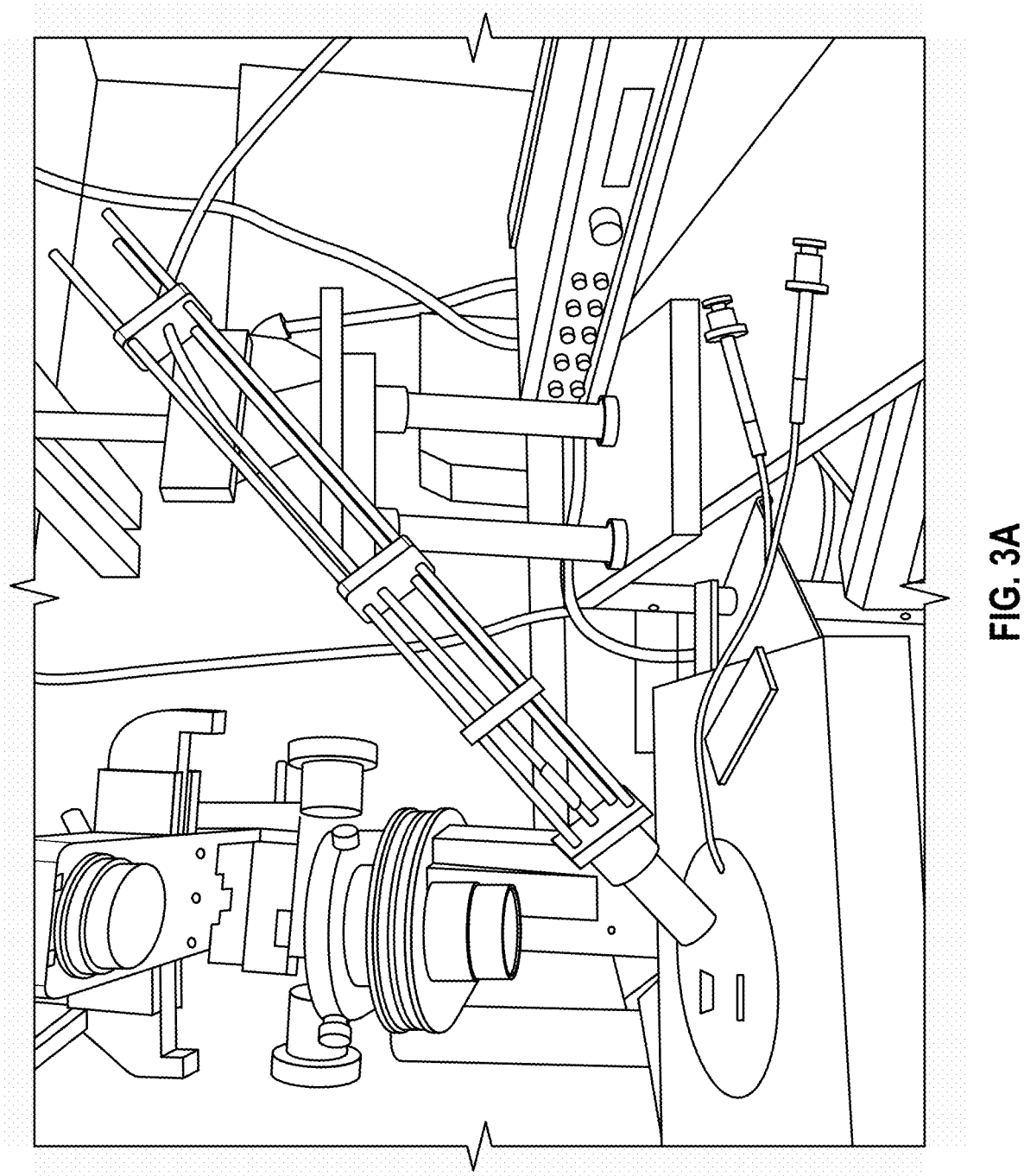
FIG. 3A is an optical system for scattered light measurements of the nanoantennas of FIG. 1F according to the present disclosure.
Figure 3B:
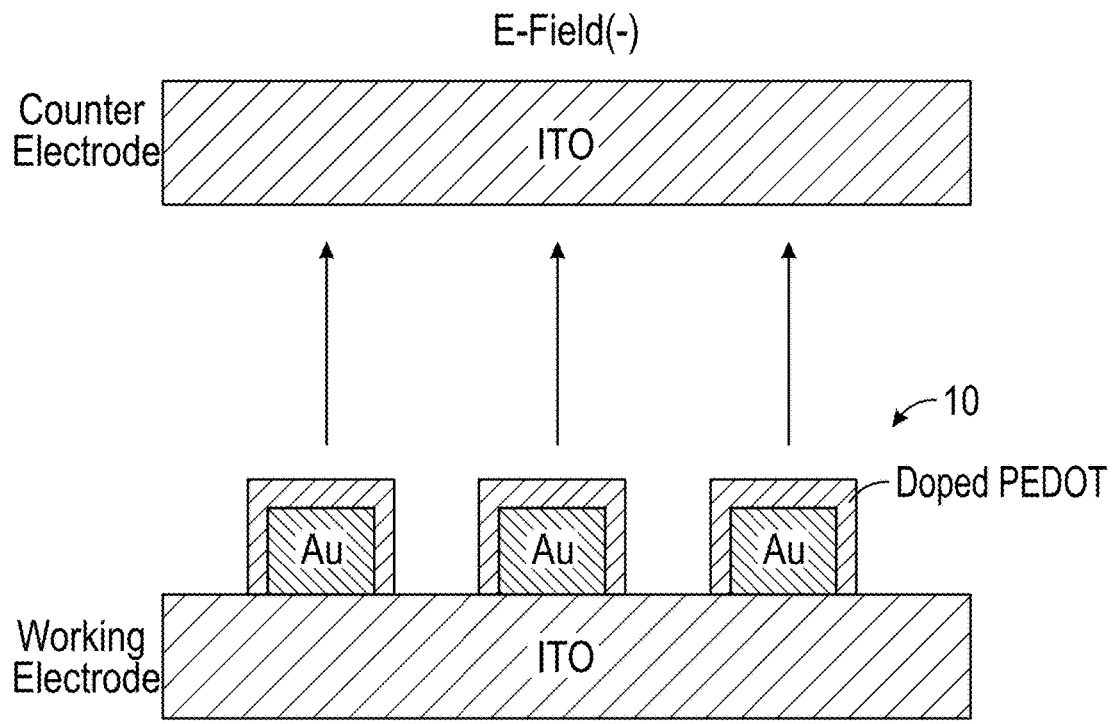
FIGS. 3B and 3C are schematics of an electric field when PEDOT is doped and de-doped, respectively.
Figure 3C:
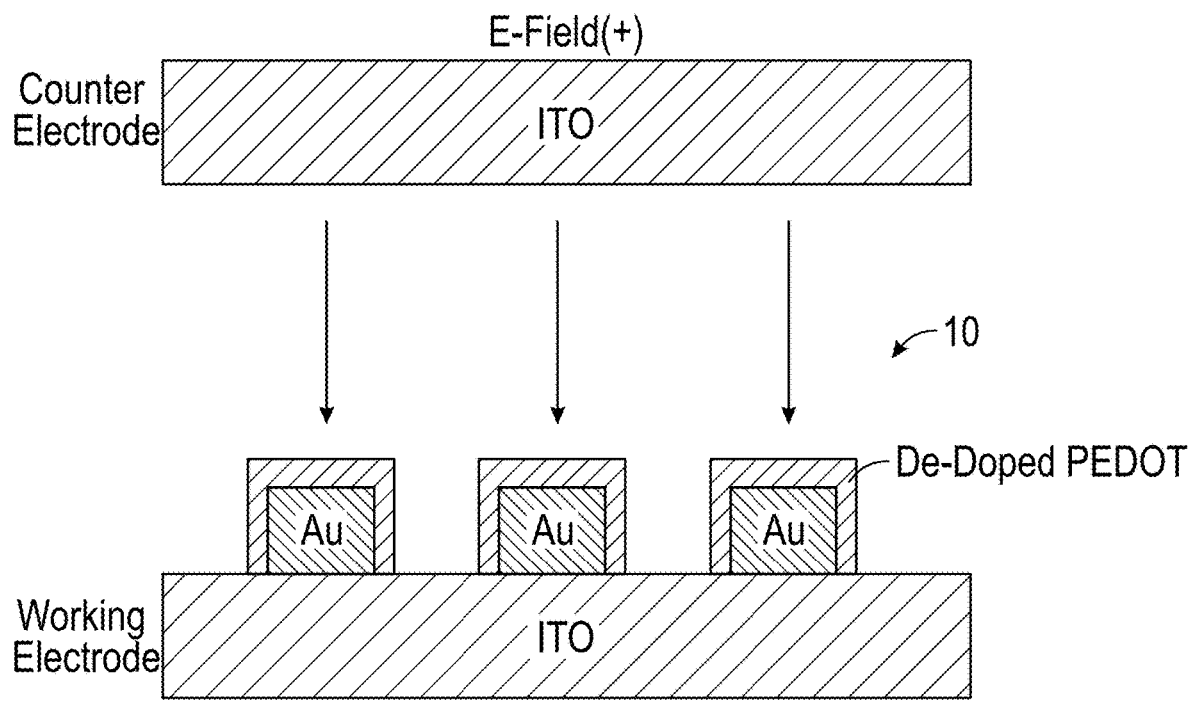
Figure 3D:
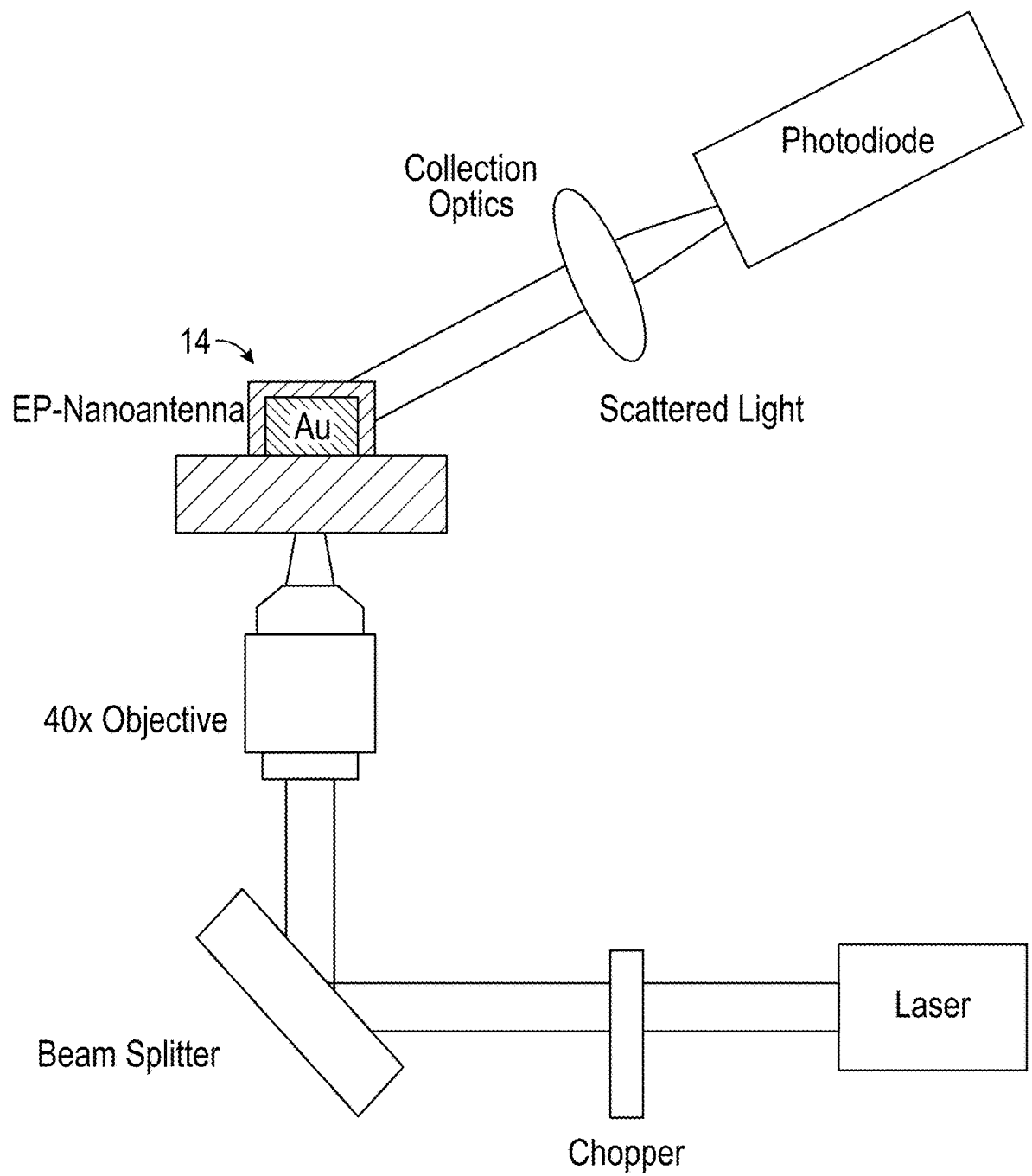
FIG. 3D is a schematics of the optical setup of FIG. 3A.

The present disclosure provides an optical nanoantenna array 10 including a plurality of electro-plasmonic probes. With reference to FIGS. 1E and 1F, the nanoantenna array 10 includes a transparent substrate 12. The nanoantenna array 10 also includes a plurality of nanoantennas 14 each of which has a conductive nanodisk 16 formed from a conductive material, such as graphene and/or metals, including but not limited to, gold, silver, aluminum, copper, titanium, magnesium, palladium, zirconium, and variants thereof, such as alloys, oxides, and nitrides.

The nanoantennas 14 further include a conforming biocompatible electrochromic polymer layer 18 or coating disposed over the nanodisks. As used herein the term "biocompatible" denotes any material that can be used with tissue without causing harm thereto and the term "conformable" denotes that the layer is compliant and adopts the shape of the surface onto which it is coated on. The nanoantennas 14 may have any suitable cross-sectional shape, such as a circle, a rectangle, an oval, a polygon, a nanohole and the like. The nanoantennas 14 may have a lateral dimension (e.g., parallel to the working surface of substrate 12 on which the nanoantennas 14 are disposed, such as diameter, width, and/or length) may be from about 50 nm to about 200 nm, in embodiments from about 70 nm to about 100 nm. The nanoantennas 14 may have a thickness of from about 10 nm to about 100 nm, in embodiments from about 30 nm to about 70 nm. The lateral dimension of the nanoantenna 14 may be larger than the thickness.

The nanoantennas 14 may be disposed in any suitable pattern, such as a two dimensional matrix. In embodiments, the nanoantennas 14 may be separated by any suitable distance, which may be from about 100 nm to about 1000 nm, in embodiments from about 300 nm to about 600 nm. In a two-dimensional matrix, the first and second (e.g., horizontal and vertical) dimensions may be the same, in embodiments the first and second dimensions may be different. In further embodiments, the nanoantennas 14 may be disposed on the substrate 12 in a matrix pattern with a periodicity of about 500 nm in either direction from each of the nanoantennas 14. This allows for millions of nanoantennas to be disposed on the substrate 12 provided there is sufficient surface area. With reference to FIG. 2A, a scanning electron microscope (SEM) image of electrogenic (cardiomyocyte) cells disposed on the nanoantenna array 10 according the present disclosure illustrates the substantial size difference between the nanoantennas 14 (shown as dots) and cells.

As described above, the nanoantennas 14 further include a biocompatible electrochromic polymer layer 18 disposed over each of the nanodisks 16. In embodiments, the electrochromic polymer of the layer 18 acts as an electric-field controlled active load for progressive and reversible tuning of plasmonic nanoantenna resonances in real-time. Suitable biocompatible electrochromic polymers for forming the layer 18 include, but are not limited to, poly(3,4-thylenedioxythiophene):polystyrene sulfonate (PEDOT:PSS), polypyrrole, polyaniline, poly(3,4-propylenedioxythiophene) (Polypro DOT), combinations and derivatives thereof. The electrochromic polymer layer 18 may have a thickness from about 10 nm to about 50 nm, in embodiments from about 20 nm to about 30 nm. The electrochromic polymer layer 18 conforms to the nanodisk 16 and is of sufficient thickness to allow for spatial overlap with electromagnetic hot spots 20 of the nanoantennas 14 (FIG. 2B). In particular, use of ultrathin electrochromic material around the hot spots achieves sensitive and fast far-field response to local electric-field dynamics. Finite difference time domain (FDTD) simulations as described below in the Examples confirm that the electromagnetic field is confined to narrow regions around the nanoantenna 14, namely at top and bottom circumferences of the nanodisk 16.

The substrate 12 may be either non-conductive or conductive, such as a glass substrate having an indium tin oxide (ITO) coating with a conductivity from about 8 Ω/cm to about 12 Ω/cm. The substrate 12 may have any suitable dimensions for accommodating any suitable number of the nanoantennas. Although a conductive substrate or a substrate having a conductive coating or surface may be used to aid in polymerization and formation of electrochromic polymer layer 18, a conductive coating is not necessary for operation of the nanoantenna array 10. Various techniques may be used to enable electrostatic deposition of the biocompatible electrochromic polymer.

The nanoantenna array 10 according to the present disclosure has a far-field response to local electric field dynamics. In view of optical circuit theory and FIG. 2C, the electrochromic load of the layer 18 acts as a parallel coupled RC circuit 22a including resistive (ohmic losses) and capacitive impedances, the nanodisk acts as an RLC circuit 22b composed of resistive (ohmic losses) and inductive impedances, and the medium 22c acts as a parallel coupled capacitance. The electric-field controlled capacitance of the electrochromic load couples the low-frequency local electric field dynamics (e.g., less than about 1 kHz) to high-frequency (e.g., from about 200 THz to about 500 THz) electromagnetic resonances. The model of FIG. 2C shows that switching from the doped to de-doped state of the electrochromic load causes red shifting of the far-field plasmonic response in agreement with three-dimensional finite difference time domain (3D FDTD) simulations as shown in FIG. 2D, which illustrates far field response of the nanoantenna 14 to the local electric field dynamics. Electrochromic switching of the PEDOT:PSS load between doped states of plots 50a and 50b and de-doped states of plots 60a and 60b leads to red shifting of the plasmonic resonance. Strong agreement between FDTD stimulations of plots 50a and 60a and lumped nanocircuit model of plots 50b and 60b as ob served.

With reference to FIGS. 1A-E, the nanoantenna array 10 may be formed using electron beam photolithography. Initially, a polymethyl methacrylate (PMMA) layer 30 may be formed on the substrate 12 (FIG. 1A). The PMMA layer 30 may then be patterned using an electron beam to obtain a desired pattern as described above (FIG. 1B). After patterning, the substrate 12 may be developed using any suitable lithography developer solution such as methyl isobutyl ketone (MIBK) and isopropyl alcohol at a ratio from about 1:4 to about 1:2, in embodiments, the ratio may be about 1:3. A conductive material layer 32 is then deposited over the patterned PMMA layer 30 using an electron-beam metal evaporation/deposition process (FIG. 1C). The conductive layer 13 may have the thickness corresponding to the desired thickness of the resulting nanodisks 16. Thereafter, the PMMA layer 30 is removed along with any conductive layer deposited over the PMMA layer 30 thereby only leaving the conductive layer 32 disposed between the raised surfaces of the PMMA layer 30 and forming the nanodisks 16. In the final step, a PEDOT:PSS layer 18 is selectively deposited on the nanodisks 16 to form the nanoantennas 14 as described in further detail below in the "Examples" section.

The electro-plasmonic nanoantenna array 10 may be used to measure electrogenic activity of biological tissue using electrochromic response to electric-field dynamics through the nanoantennas 14. The nanoantenna array 10 may be placed in contact with tissue and may be used as part of a measurement system 110. Suitable tissue may be any tissue cells having sufficient electrogenic activity, such as cardiac tissue, neural tissue, etc.

Figure 8A:
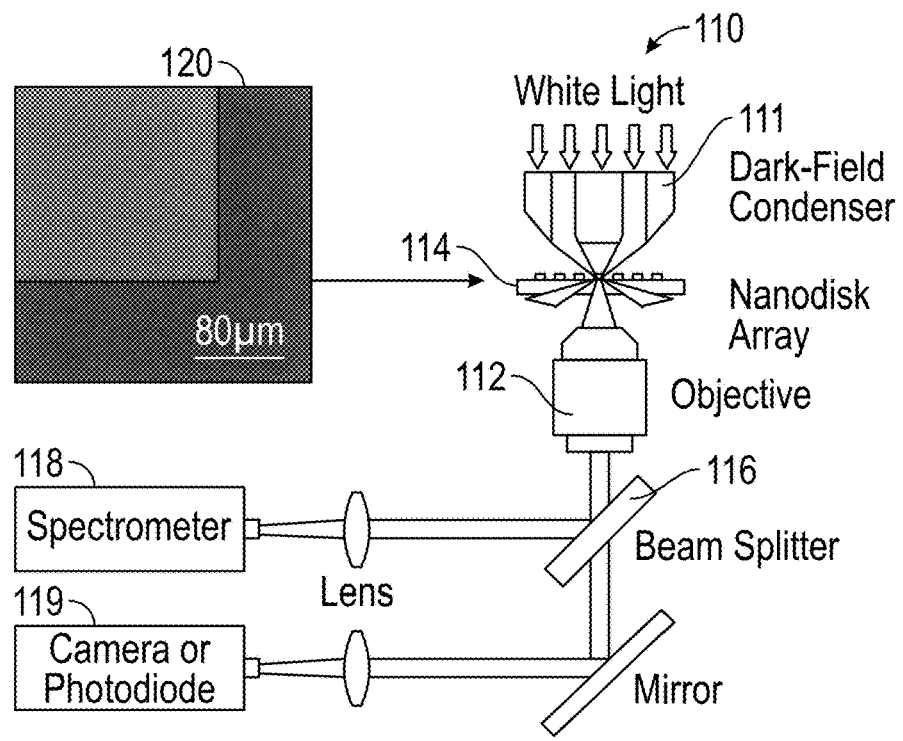
FIG. 8A is an experimental setup for dark-field scattering measurements of electro-plasmonic nanoantenna of FIG. 1F and for measuring electrogenic activity of biological tissue using electrochromic response of electro-plasmonic nanoantenna of FIG. 1F.

With reference to FIG. 8A, the system 110 may include a light source 111, an imaging/collection objective 112, and the nanoantenna array 10 disposed therebetween and in contact with tissue "T". The system 110 may also include an optional beam splitter 116, which provides light focused by the objective 112 to one or more measurement devices, such as a spectrometer 118 and an imaging device 119. The spectrometer 118 and the imaging device 119 allow for label-free and real-time optical recording of cellular electrogenic activity at low intensity of the tissue "T."

The following Examples illustrate embodiments of the present disclosure. These Examples are intended to be illustrative only and are not intended to limit the scope of the present disclosure. Also, parts and percentages are by weight unless otherwise indicated. As used herein, "room temperature" or "ambient temperature" refers to a temperature from about 20° C. to about 25° C.

EXAMPLES

Example 1

This example describes fabrication of a plasmonic nanoantenna array. Plasmonic nanoantenna array was fabricated using electron beam lithography (EBL). A high conductivity (from about 8 to about 12 Ω/cm) ITO glass slides from Structure Probe, Inc. were used to minimize substrate charging during large area electron beam lithography. The fabrication process started with cleaning the ITO substrate in a sonication bath of acetone and isopropyl alcohol for about 5 minutes each. After removal from the final sonication bath, the slide was blow-dried using a stream of nitrogen. Electron beam positive photoresists polymethyl methacrylate (PMMA) from Micro-chem, 495 PMMA A4 were then spin coated at about 4,000 rpm on the cleaned ITO substrate followed by pre-exposure bake at about 180° C. on a hot plate for about 90 seconds. Electron beam patterning was done using the Nanometer Pattern Generation System (NPGS) on a FEI Quanta 3D field emission microscope to form gold nanodisks having a diameter of about 90 nm with a periodicity of about 500 nm therebetween in a grid pattern. Electron beam writing process was done at a current of about 80 pA. The electron beam was accelerated at about 30 kV and a PMMA exposure dose of about 400 μC/cm$^2$ was used. In addition to writing the nanoparticle patterns, a perimeter of rectangular bars measuring about 1.2 mm×0.25 mm around the nanoparticle patterns was also written, which was used as a visual marker during the characterization process. The sample was developed with a development solution of MIBK and isopropyl alcohol at a ratio of about 1:3 for about 1 minute and subsequently placed in a solution of isopropyl alcohol for about 1 minute to stop the development. The sample was then dried under a stream of high-purity nitrogen. The electron-beam metal evaporation/deposition process of about 45 nm thick gold layer was conducted on the developed sample. The deposition was carried out at a pressure of about $1.2 \times 10^{-6}$ Torr and the evaporation rate of about 0.5 Å/sec. The sample was soaked in acetone for approximately 10 hours before a lift-off process of about 5 seconds in acetone sonication. Finally, the sample was rinsed with isopropyl alcohol for about 1 minute and dried under a stream of nitrogen.

Example 2

This example describes determining electric field sensitivity of electro-plasmonic nanoantennas. Electro-optic measurements were performed using controlled electric-fields generated through a transparent counter electrode (ITO coated glass slide). The electric-field values (from about $2 \times 10^2$ V/cm to about $8 \times 10^2$ V/cm were used and are analogous to transient electric fields generated during electrogenic cell firing. With reference to FIGS. 3A-D, intensity based scattering was obtained using a laser beam of about 670 nm and about 3 mW that was focused to a diffraction limited spot with a long working-distance objective (about 40×, and numerical aperture of about 0.6). Laser diode was modulated at a frequency of about 500 Hz, and the scattered light from the electro-plasmonic nanoantenna was detected with an amplified photodetector connected to a lock-in amplifier. The zero-bias scattering signal ($S_0$) and the electric-field modulated change in the scattering signal ($\Delta S$) were monitored to obtain differential scattering signal ($\Delta S/S_0$). Loaded (coated) and pristine (uncoated) nanoantennas were observed for effect of PEDOT:PSS coating on nanoantennas for all-optical monitoring of the local electric-fields from subcellular spot sizes. A value of about $2.8 \times 10^{-8}$ cm/V for pristine nanoantenna $(\Delta S/S_0)^P$ was obtained and is in agreement with previous experimental studies. Electric-field sensitivity of the electro-plasmonic nanoantenna $(\Delta S/S_0)^{EP}$ of about $9.1 \times 10^{-5}$ cm/V was approximately $3.25 \times 10^3$ larger than the sensitivity of pristine nanoantennas due to the PEDOT:PSS loading.

A quasistatic model treating gold nanodisk and conducting polymer as a Drude metal was used to provide physical insight into the sensitivity enhancement. In quantitative terms, the spectral shift of the resonances (through coupled electrochromic PEDOT:PSS load) was given by the resonance relation of formula (I):

$$\Delta \lambda_{LSP}^{EP} = \frac{\omega_p^2 \lambda_{LSP}^3}{8\pi^2 c^2} \left[ \frac{(1-L)/L}{\left(\varepsilon_\infty + \varepsilon_{PEDOT}\left(\frac{1-L}{L}\right)\right)^2} \right] \Delta \varepsilon_{PEDOT} \quad (I)$$

In formula (I) L is the geometrical factor for the nanoantenna, ωp is the metal plasma frequency, $\varepsilon_\infty$ is the high frequency contribution to metal dielectric function, and $\varepsilon_{EPEDOT}$ is the dielectric constant of the PEDOT:PSS film. In formula (I) the resonance wavelength shift $\lambda_{LSP}^{EP}$ is proportional to $\Delta \varepsilon_{PEDOT}$, the change in the PEDOT:PSS permittivity with electric field. This analytical model captures all of the three prominent experimental observations. First, the linear relationship between differential signal change and local electric-field strength is associated with alteration of plasma frequency and thus linear modulation of the dielectric permittivity with electric field ($\Delta \varepsilon_{PEDOT} \propto E_{local}$). Second, a negative voltage applied to pristine nanoantenna stiffens the resonant free electron spring (plasma frequency of the metal) and blue shifts the LSP resonance to higher frequencies ($\Delta \lambda_P \propto E_{local}$). This observation is opposite in the case of electro-plasmonic nanoantennas, where a negative voltage caused red shifting of the LSP resonances ($\Delta \lambda_P \propto -E_{local}$). Reversal of the resonance wavelength shift direction with PEDOT loading is explained in our model through the electric-field induced modulation of the PEDOT plasma frequency, which is much larger than that of the pristine nanoantenna (e.g., uncoated nanodisk). Third, large differences between electron densities in gold (about $10^{23}$ per cm$^3$) and PEDOT:PSS (about $10^{20}$ per cm$^3$) lead to experimentally observed drastic sensitivity enhancements with electrochromic loading as shown in formula (II):

$$(\Delta S/SE)^{EP}(\Delta S/SE)^P \propto (N_{Au}/N_{PEDOT})^{5/6} \quad (II)$$

Example 3

This example describes determination of a detection limit of the electro-plasmonic nanoantennas of Example 1. Optical shot noise presents a bottleneck for optical measurements from small structures, such as genetically encoded voltage indicators (GEVI), which have tiny cross sections (e.g., about $10^{-2}$ nm$^2$) and low quantum yields (from about $10^{-3}$ to about $10^{-4}$). To achieve high signal to shot noise ratio (SSNR) measurements, the photon counts were increased. Physically much larger electro-plasmonic nanoantenna of Example 1, which are about 90 nm in diameter, have approximately 3.6 million times larger cross sections (about $3.6 \times 10^4$ nm$^2$) than GEVIs. Furthermore, LSP mediated light scattering from loaded nanoantenna results in high conversion efficiencies from incident to scattered light. Using experimentally obtained $(\Delta S/S_0 E)^{EP}$ and 3-D FDTD simulations, SSNR scaling was calculated together with the corresponding differential signal $(\Delta S/S_0)^{EP}$ for varying electric field strength as illustrated in FIG. 4A.

Figure 4A:
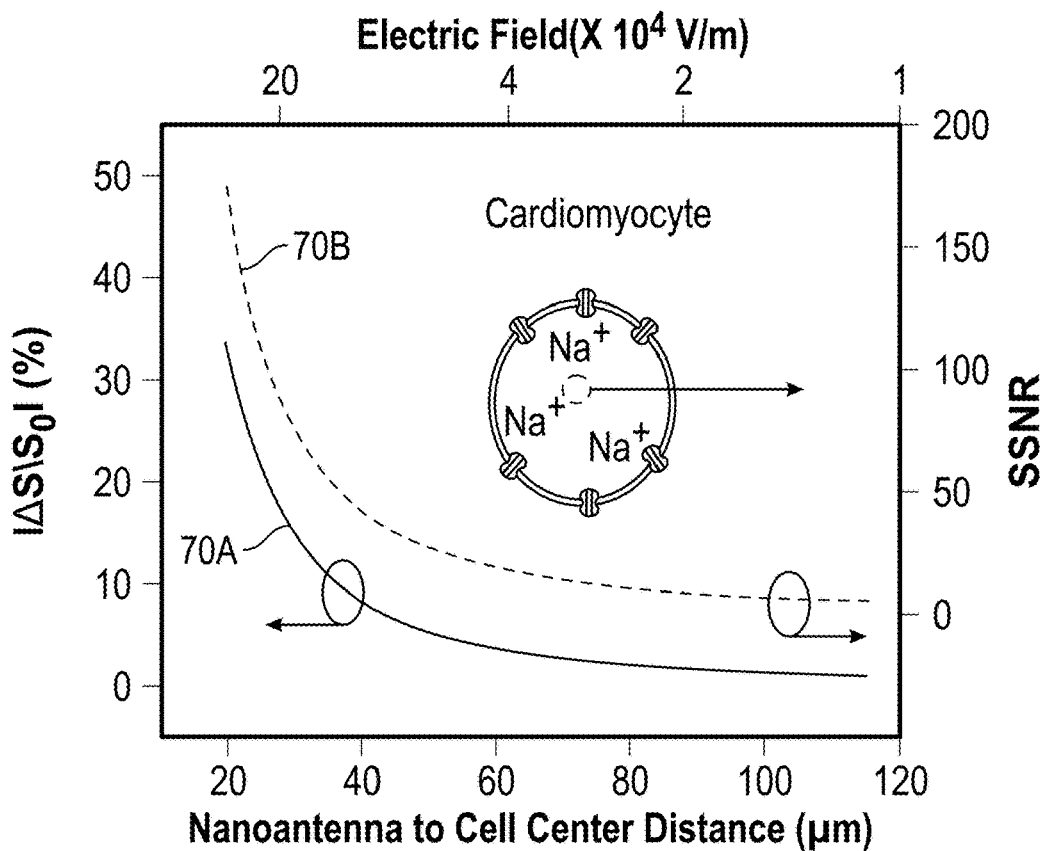
FIG. 4A is a differential scattering signal plot and a signal to shot noise ratio (SSNR) plot illustrating electric field sensitivity simulation for the nanoantennas of FIG. 1F.
Figure 4B:
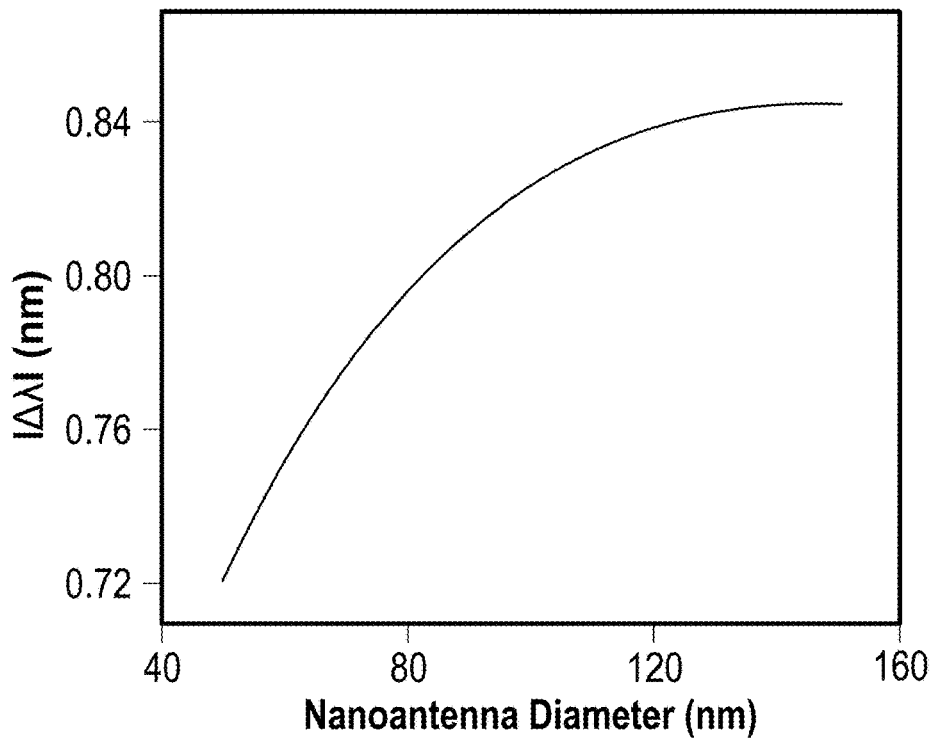
FIG. 4B is a plot of wavelength sensitivity to the diameter of the nanoantennas of FIG. 1F.

FIG. 4A shows electric field sensitivity for a 90 nm diameter gold nanodisk, applied electric field varies with distance from the cell center (inverse square law), assuming an incident intensity of 300 W/cm$^2$, an integration time of 1 ms, numerical aperture of 0.45 and an overall detection efficiency of 50%. Differential scattering signal (plot 70a) and SSNR (plot 70b) were calculated at a different distance from the cell center (bottom axis). FIG. 4B shows scaling of electro-plasmonic resonance wavelength shift with respect to nanoantenna diameter.

Analysis of SSNR scaling with distance (FIG. 4A bottom axis) revealed that electro-plasmonic nanoantenna can remotely measure activity of excitable cells from distances up to about 100 μm in a similar fashion to extracellular microelectrodes. Further improvements in photon counts and SSNRs could be achieved by packing electro-plasmonic nanoantenna closely. Scaling of the electro-plasmonic nanoantenna dimensions to achieve higher filling factors moderately affects the electric-field sensitivities (about %10) (FIG. 4B). However, below 50 nm diameter, rapid scaling of nanoantenna scattering cross section ($C_{scat} \propto \alpha^6$) with nanoantenna diameter α illustrated a photon count drop.

Example 4

Figure 5A:
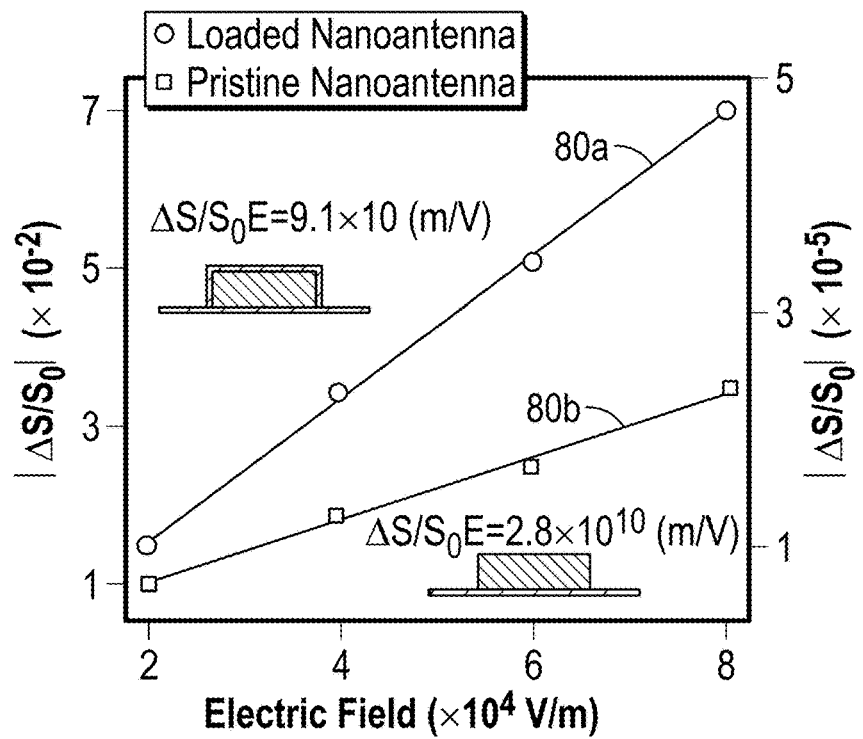
FIG. 5A shows plots of differential scattering signal as a function of electric field strength of PEDOT:PSS coated antennas of FIG. 1F and uncoated nanoantennas.

This example describes detecting electrogenic activity using electrochromic response of the nanoantennas to the external electric-field dynamics of Example 1. FIG. 5A shows plots 80a and 80b of a differential scattering signal as a function of electric field strength for coated nanoantennas and uncoated nanodisks, respectively. Experimental measurements from uncoated nanodisks with no electrochromic load are shown as plot 80b and are much weaker than that of plot 80a of the nanoantennas of Example 1, namely, PEDOT:PSS coated nanodisks.

Figure 5B:
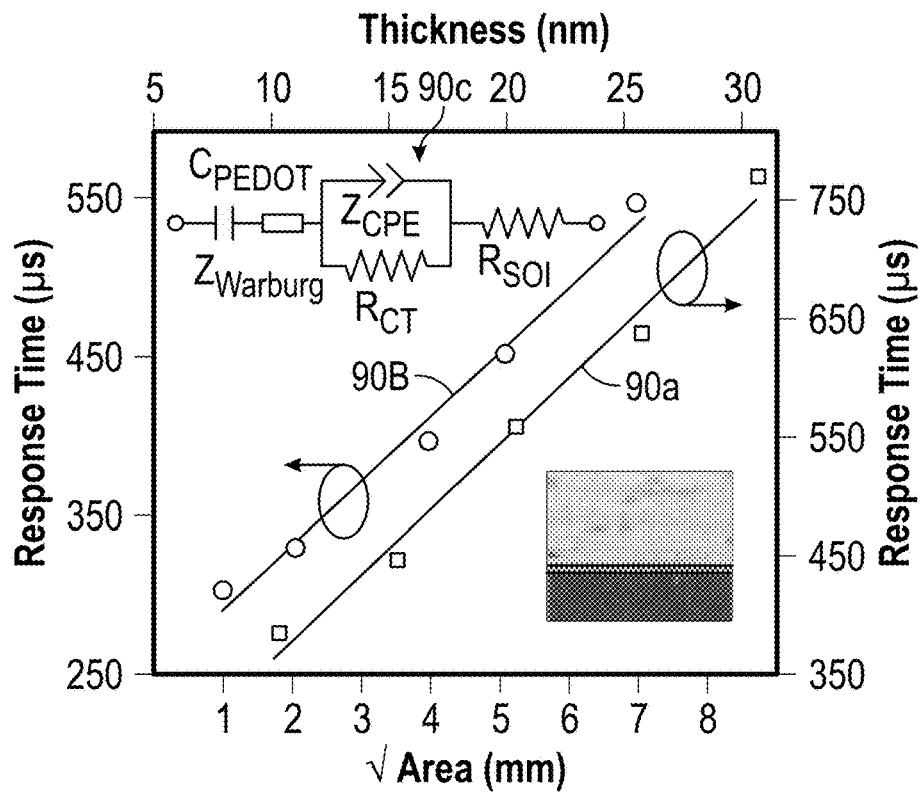
FIG. 5B shows plots of response time as a function of PEDOT:PSS coated gold area and PEDOT:PSS thickness, an equivalent circuit diagram, and an inset showing SEM image of the PEDOT:PSS coated gold surface.

To optimize temporal response of the nanoantennas of Example 1, electrochemical characteristics of thin PEDOT:PSS film coated gold surfaces with varying surface areas and PEDOT:PSS thicknesses were obtained as shown in FIGS. 5B. Linear scaling of the switching speed with the active thickness of the PEDOT:PSS film was observed in plots 90a and 90b of FIG. 5B, which show response time as a function of thickness and area of the PEDOT:PSS film, respectively. In particular, plots 90a and 90b show PEDOT:PSS response times versus electrochromic device area, and response times versus electrochromic device thicknesses for devices consisting of films with thickness of about 20 nm, and having an area of about 49 mm$^2$, respectively.

Figure 5C:
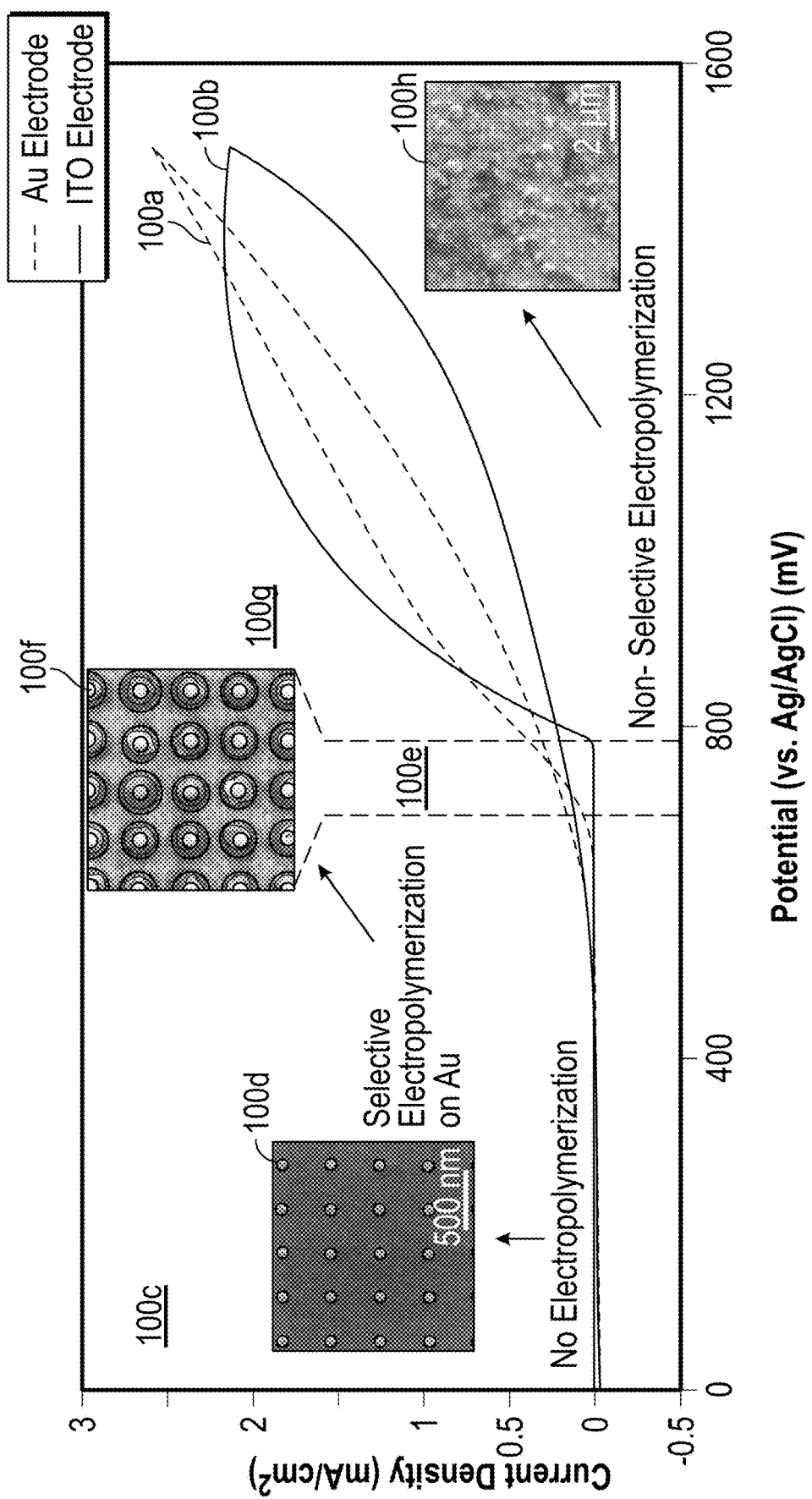
FIG. 5C shows plots of current density as a function of voltage potential during cyclic voltammetry of PEDOT:PSS on gold nanodisks and ITO coated substrate as well as inset SEM images of the nanoantenna coating for various deposition voltages.

Ultrafast switching of electro-plasmonic probes can be achieved through fabrication of small area and ultra-thin PEDOT films that require ultra-short distances for ionic motion. With reference to FIG. 5C, shows plot describing selective deposition of PEDOT:PSS on gold surface as plot 100a and on the ITO coated substrate as plot 100b using cyclic voltammetry of approximately 10 mM EDOT in about 100 mM NaPSS solution and scan rate of about 50 mV/s$^{-1}$. The electropolymerization of 3,4-ethylenedioxythiophene (EDOT) was giving rise to a crossover of the reverse cathodic scan over the anodic scan, which is known as "nucleation loop." Region 100c represents no PEDOT deposition. SEM micrograph 100d for polymerization potential of less than about 675 mV. Region 100e represents the voltage region where only gold nanodisks are coated with PEDOT (from about 675 mV to about 780 mV). The corresponding SEM image for polymerization potential at 760 mV is shown in SEM image 100f. The region 100g represents voltages where both nanodisks and ITO substrate are coated with PEDOT (at a voltage of above 780 mV). The SEM image 100h shows polymerization potential at 810 mV with both nanodisks and ITO substrate being covered with PEDOT:PSS.

Figure 6A:
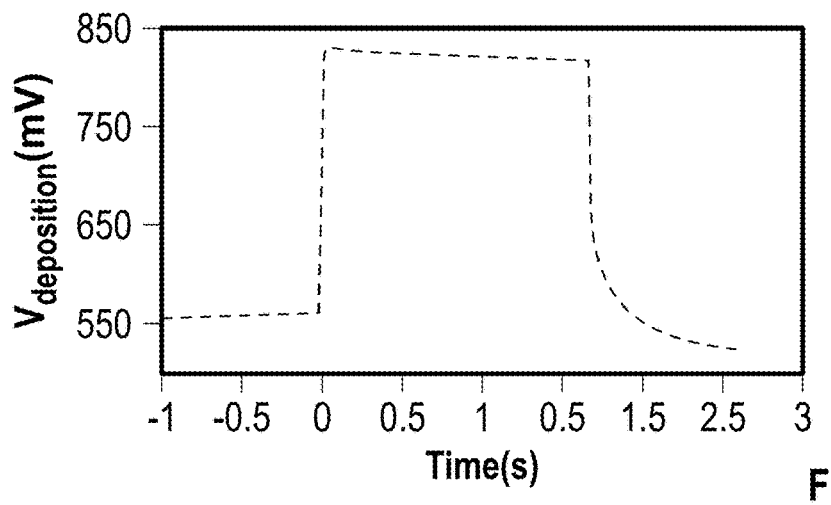
FIGS. 6A and 6B are plots of voltage and current density as a function of time, respectively, during deposition of a PEDOT:PSS coating on a gold electrode.
Figure 6B:
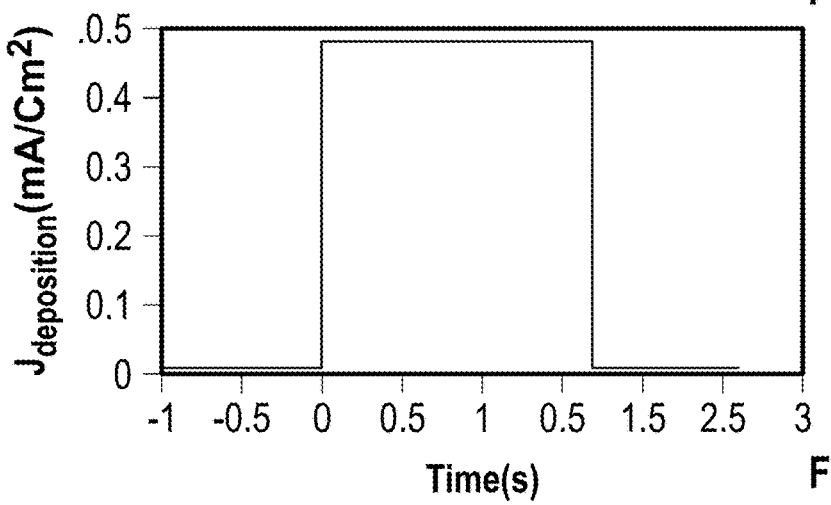
Figure 6C:
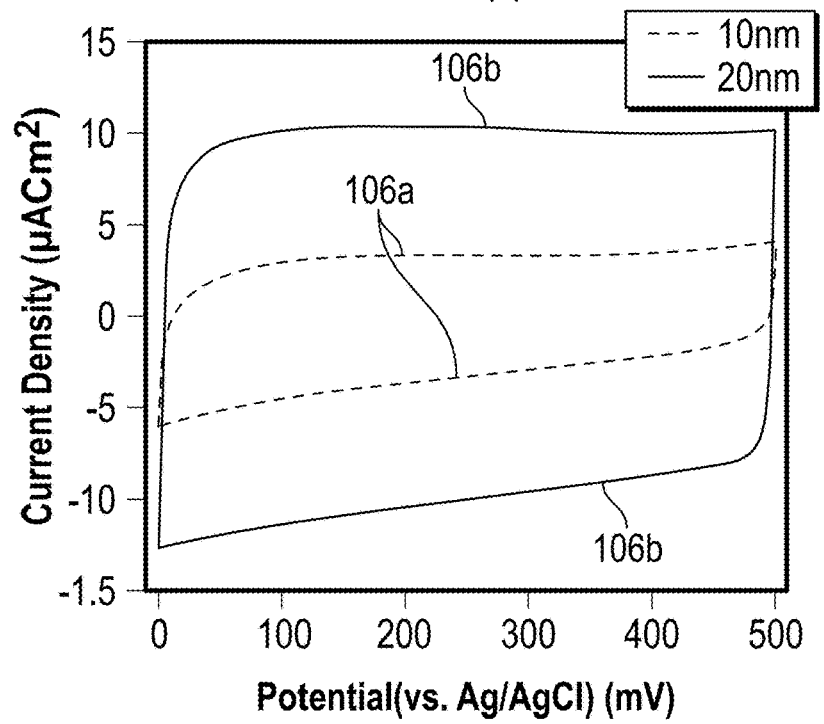
FIG. 6C shows cyclic voltammogram of a 10 nm and a 20 nm PEDOT:PSS coated electrodes.

With reference to FIGS. 6A-C, thicknesses of the deposited PEDOT:PSS layers were precisely controlled by monitoring the total charge transfer during the electrodeposition process. Cyclic voltammetry (CV) measurements were performed to verify the thicknesses of the PEDOT:PSS films and the associated capacitances as shown in FIG. 6C. Galvanostatic deposition of approximately 5 nm PEDOT:PSS film on gold electrode having a thickness of about 120 nm on a glass substrate. A constant current of about 0.48 mA/cm$^2$ was applied for about 1.67 s as shown in a plot 102 of FIG. 6A. Corresponding voltage was recorded by the potentiostat as shown in a plot 104 of FIG. 6B. Cyclic voltammogram of 10 nm PEDOT:PSS deposited electrode is shown in plot 106a and a cyclic voltammogram of 20 nm PEDOT:PSS deposited electrode is shown in plot 106b. The area of enclosed by the voltammogram increases with the increasing thickness.

The electrochemical gold electrode-PEDOT: PSS system was modeled using an equivalent circuit diagram 90c of FIG. 5B which includes solution resistance Rs, PEDOT:PSS layer capacitance ($C_{PEDOT}$), finite-length Warburg diffusion impedance ($Z_w$), charge transfer resistance (RCT), and a constant phase element ($Z_{CPE}$). Electrochemical impedance spectroscopy (EIS) was used obtain these circuit parameters.

Figure 7A:
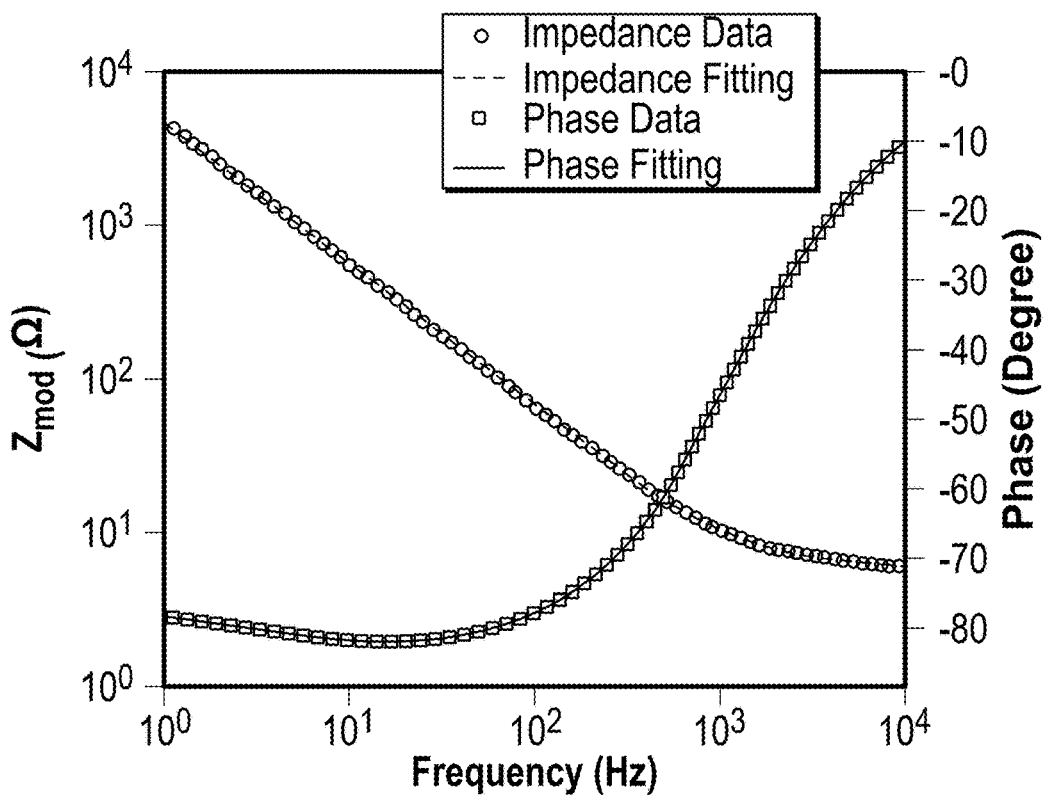
FIG. 7A is a Bode impedance plot and a phase plot of a PEDOT:PSS coated gold electrode.
Figure 7B:
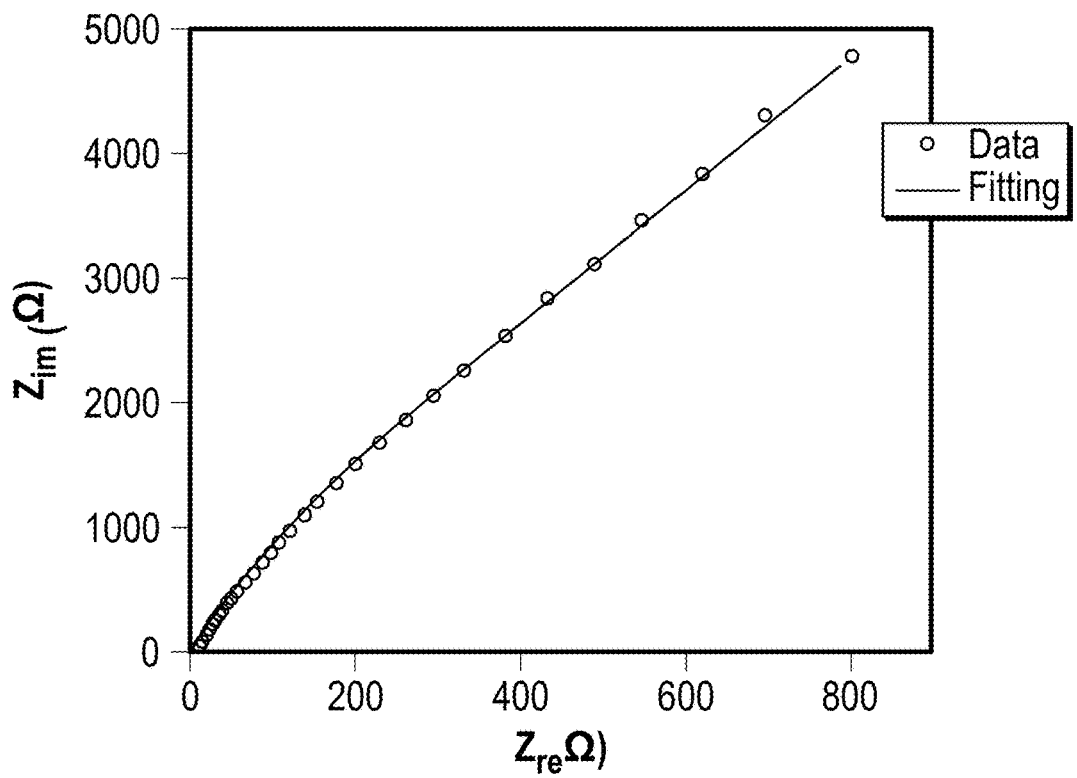
FIG. 7B is a Nyquist impedance plot of a PEDOT:PSS coated gold electrode.

There was agreement between this lumped-circuit model and the experimental data as demonstrated within a broad frequency range from about 1 Hz to about 10 kHz (FIG. 7A-B). Gold electrode coated by a PEDOT: PSS layer having a thickness of about 10 nm and an area of about 49 mm$^2$ was prepared. Impedance plots of the PEDOT: PSS coated electrode in 1M NaCl solution were obtained and results are plotted in FIG. 7A, which shows a Bode plot, and FIG. 7B, which shows a Nyquist plot. To obtain impedance measurement, AC energy was applied at a voltage $E_{AC}$=10 mV rms and DC voltage $E_{DC}$=200 mV at a frequency from about 1 Hz to about 10 kHz.

It was observed that the PEDOT:PSS coated electrodes switched from capacitive to resistive nature at higher frequencies as the magnitude of total impedance dropped. Drastically lower diffusion pseudocapacitance $C_D$ for the 10 nm thick PEDOT:PSS layer was about 0.177 mF and with respect to 20 nm film, $C_D$ was about 2.26 mF. This was due to decreased transit time for the ionic motion. It was observed that the lower electronic bulk capacitances ($C_{PEDOT}$) dominated at frequencies below 1 kHz impedance of the electrode-PEDOT: PSS system. EIS measurements also confirmed that decreasing surface area reduced the bulk capacitance ($C_{PEDOT}$) of the electrode-PEDOT: PSS system.

Potential step voltammetry measurements were also obtained in order to determine the switching times of PEDOT: PSS films on gold surfaces. It was observed that the response times scaled linearly with the thickness and active area of the thin PEDOT: PSS film being in agreement with EIS measurements and lumped-circuit models (FIG. 5B inset). These observations confirm that thinner and smaller area of PEDOT: PSS loads are used to achieve ultra-fast switching times due to the decreased RC response times.

The method of Example 1 provides for a selective electropolymerization technique allowing for precise and conformal loading of gold nanoantennas with ultra-thin PEDOT: PSS polymer. The method is based on PEDOT nucleation point difference on ITO coated glass and gold surfaces under the potentiostatic conditions (e.g., about 807.4 mV for ITO and about 744.9 mV for gold) to achieve electrodeposition on gold while avoiding deposition on the conductive ITO surface (FIG. 5C). Reliable conformal loading of the large area nanoantenna array with PEDOT: PSS was also achieved. Deposited PEDOT: PSS thickness was optimized at about 20 nm to achieve high speed response. Strong confinement of electromagnetic energy in hot spots 20 provides for high voltage sensitivity with a polymer layer that is only a few nanometers thick (FIG. 2B).

Example 5

This example describes far-field temporal response of nanoantenna characterized using dark field measurements in a spectro-electrochemical cell. With reference to FIG. 8A a measurement system 110 includes a dark-field condenser 111, an imaging/collection objective 112, and an electroplasmonic nanoantenna array 114 disposed therebetween. The nanoantenna array 114 includes nanoantennas of Example 1 disposed on a glass substrate. The system 110 also includes a beam splitter 116, which provides light focused by the objective 112 to a spectrometer 118 and an imaging device 119. The dark-field condenser 111 illuminates white light at high incident angles with numerical aperture of about 0.8 to about 0.95 of the dark-field condenser 111 being larger than the objective 112 in order to eliminate possibility of collecting any un-scattered light. The collection angle of about 20x, numerical aperture of about 0.45 objective was about 0.93 rad. Image 120, which was produced by the imaging device 119, shows a strong contrast with respect to areas without electro-plasmonic nanoantenna.

A square wave voltage from about −500 mV to about 500 mV was applied to the nanoantenna array 114 at a frequency of about 100 Hz by using a potentiostat in a three-electrode configuration, and recorded scattered signal using a halogen light source of the dark-field condenser 111 with output of about 100 W and an amplified photodetector of the imaging device 119 at a gain (H−Z) $4.75 \times 10^6$ V/A±5%. For thin layers of PEDOT:PSS having a thickness of about 20 nm fast response times (of about 63% decay time) on the order of few hundred microsecond (about 191 µsec) was sufficient to resolve fast electric-field dynamics as shown in FIG. 8B.

Figure 8B:
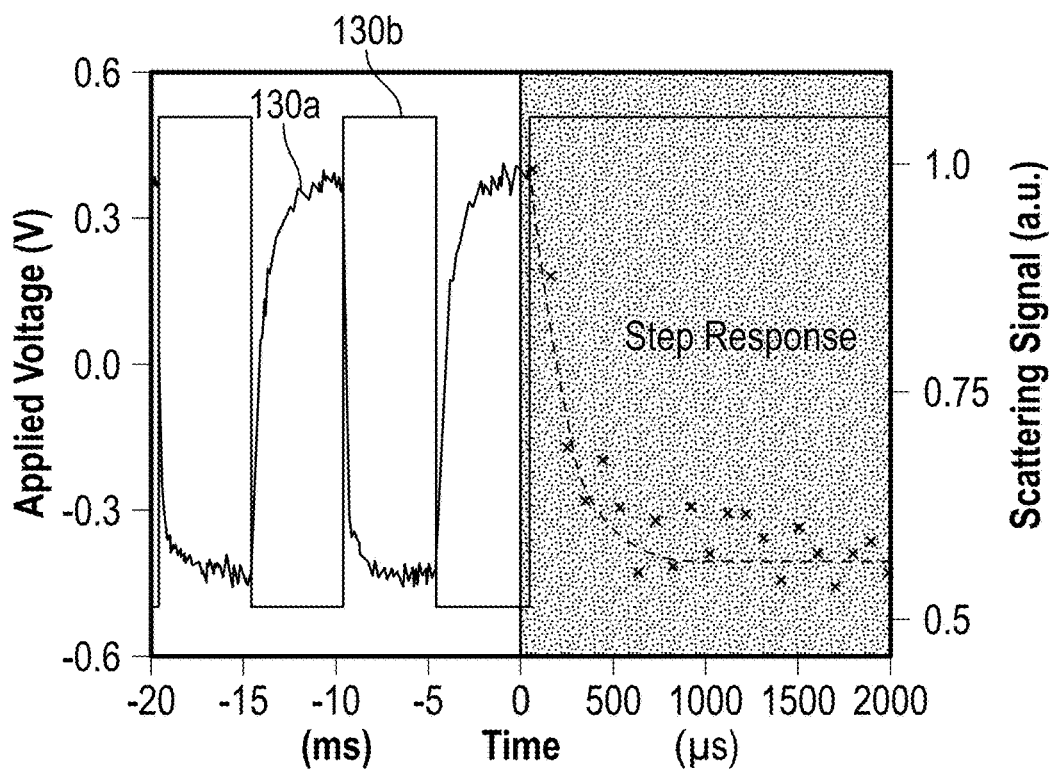
FIG. 8B shows a plot of applied pulsed voltage as a function of time to the electro-plasmonic nanoantennas of FIG. 1F and a plot of optical scattering signal as a function of time of the electro-plasmonic nanoantennas of FIG. 1F.

Plot 130a of FIG. 8B shows a dynamic response of the nanoantenna array 114 thickness to pulses of a signal shown by plot 130b in applied potential from about −500 mV to about 500 mV. Response time of the voltage probe was estimated by fitting a decaying exponential function to the scattering signal showing approximately 63% decay time of about 191 µS.

Figure 8C:
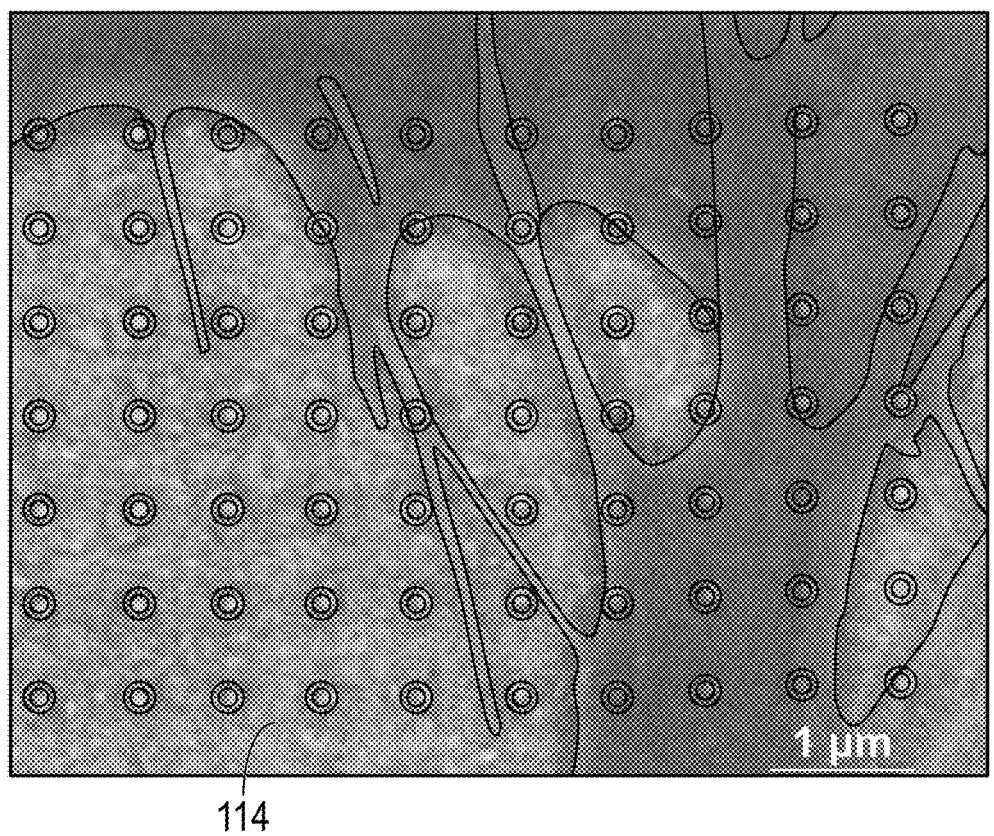
FIG. 8C is an SEM image of hiPSC iCMs disposed over the electro-plasmonic nanoantenna array of FIG. 1F at 1 μm scale.

Electrogenic cell activity was monitored using electro-plasmonic nanoantenna and monitoring the scattered light. For electrophysiological testing, human induced pluripotent stem cell (hiPSC) derived cardiomyocytes (iCMs) were seeded on the electro-plasmonic nanoantenna array 114 as shown in FIG. 8C, which shows a false-color scanning electron micrograph of hiPSC induced cardiomyocyte(iCM) on the nanoantenna array 114.

Figure 9A:
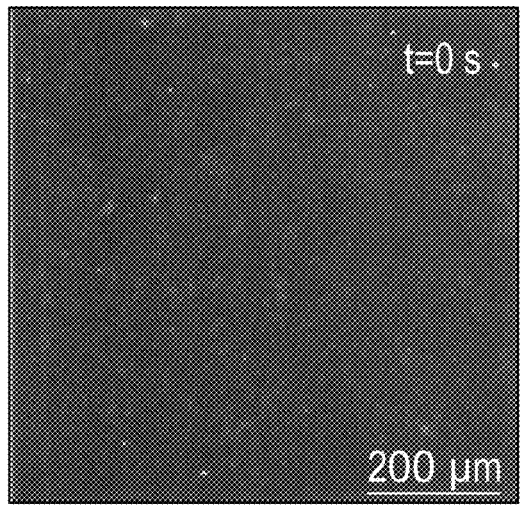
FIGS. 9A-C are time lapse fluorescent images of iCMs of FIG. 8C.
Figure 9B:
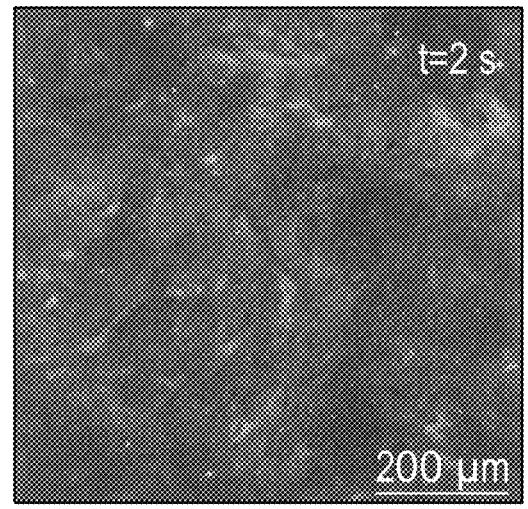
Figure 9C:
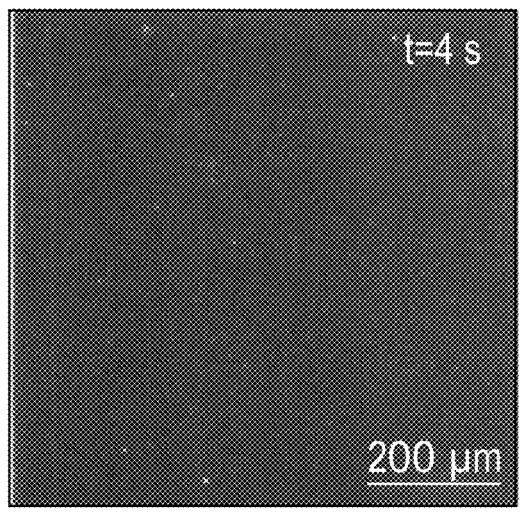
Figure 9D:
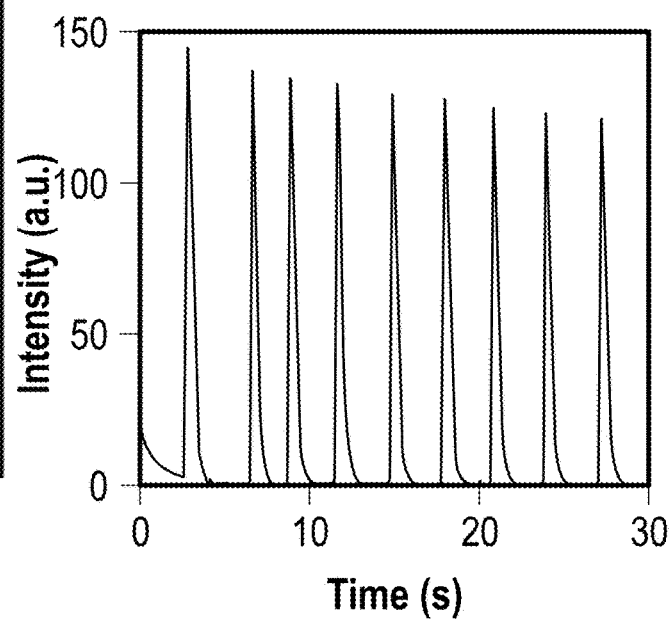
FIG. 9D is a plot of fluorescent intensity over time of iCMs of FIG. 8C.

To confirm electrogenic functionality of the cells, the iCMs were loaded with $Ca^{2+}$ indicator and captured the electrical activity of beating cells with fast $Ca^{2+}$ imaging as shown in FIGS. 9A-D. FIGS. 9A-C show time lapse florescent images of $Ca^{2+}$ flux at 0 s, 2 s, and 4 s, respectively, and FIG. 9D shows fluorescent intensity of the activity. iCM contractions during optical measurements were eliminated using a myosin II inhibitor, blebbistatin. Transmission dark-field measurements were performed using a handheld spectrometer with approximately 50 ms minimum integration time. The light intensity was about 11 mW/mm² was about $10^2$ to about $10^3$ times lower than the typical light intensities used in voltage imaging experiments with GEVIs.

Figure 8D:
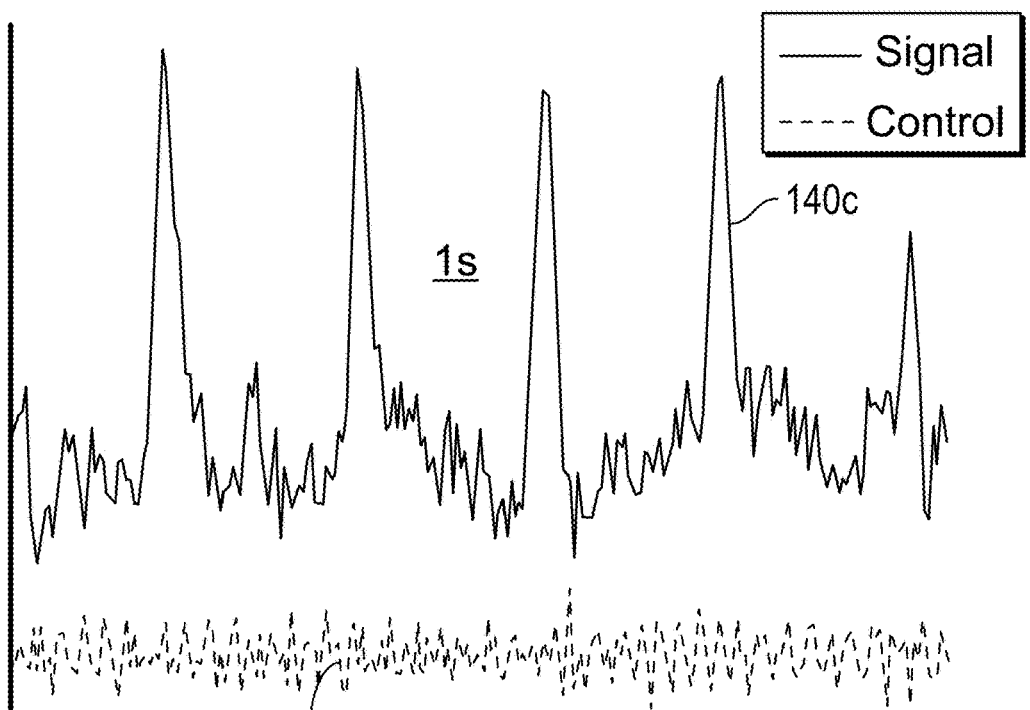
FIG. 8D shows plots of scattering signal of iCMs of FIG. 8C in the presence and absence, respectively, of the electro-plasmonic nanoantenna array of FIG. 1F.

Strong far-field signals from electro-plasmonic nanoantennas of Example 1 were also observed, demonstrating that electrochromic loading allows for label-free and real-time optical detection of electrogenic activity of the spontaneously beating iCMs as shown in plot 140a of FIG. 8D. Negative control measurements were performed to verify the origin of the electro-optic signal. In the absence of electro-plasmonic nanoantenna, no far-field optical signal was detected as shown in plot 140b in FIG. 8D. Scattering signal from cardiomyocyte on top of voltage sensor and ITO surface. iCMs were seeded at a density of about $2 \times 10^6$ cells/mL on the fibronectin coated electro-plasmonic voltage probe, attached both on top of the voltage probe and surrounding ITO substrate. About 10 µM of blebbistatin was added to decouple the electrophysiological action potential and mechanical beating. Cells were illuminated with continuous light from the dia-illumination white light source having a 100 W halogen bulb. The scattering spectrums were integrated around the peak scattering with an optical window of about 150 nm and plotted against time. Depolarization led to an increase in scattering intensity. Scattering signal collected at an integration time of about 50 ms on a spectrometer.

Electrochromic loading of the plasmonic nanoantennas of Example 1 may be used to bridge plasmonics and bioelectronics for label-free optical detection of electrogenic activity with high-sensitivity. This in turn, may be used to study the collective behavior of electrophysiologically active cell networks and pave the way for discoveries in stem cell and cardiac research. Even with low light illumination conditions compatible for continuous measurements at biologically relevant time scales (from days to weeks), it enables high signal-to-noise ratio measurements from subcellular structures by providing millions fold enhanced photon counts over GEVI, while providing $3.25 \times 10^3$ times enhanced electric-field sensitivities over conventional plasmonic nanoantennas.

It will be appreciated that of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, or material.

What is claimed is:

1. An electro-plasmonic array comprising:
    a substrate; and
    a plurality of nanoantennas disposed on a surface of the substrate, each of the nanoantennas including a conductive nanodisk and a conforming biocompatible electrochromic polymer layer wherein the nanoantennas are formed by:
    depositing a conductive layer over a patterned photoresist layer disposed over a surface of the substrate;
    removing the photoresist layer thereby retaining a plurality of conductive nanodisks disposed on the surface of the substrate; and
    depositing a conforming biocompatible electrochromic polymer layer over the plurality of conductive nanodisks thereby forming a plurality of nanoantennas.

2. The electro-plasmonic array according to claim 1, wherein the substrate is formed from glass and includes a conductive coating.

3. The electro-plasmonic array according to claim 2, wherein the conductive coating is an indium tin oxide coating.

4. The electro-plasmonic array according to claim 1, wherein the plurality of nanoantennas are disposed in a two-dimensional matrix pattern with a periodicity of about 500 nm.

5. The electro-plasmonic array according to claim 1, wherein the plurality of nanoantennas are disposed in a two-dimensional matrix pattern wherein a first distance between the nanoantennas is from about 100 nm to 1000 nm and a second distance is from about 100 nm to about 1000 nm.

6. The electro-plasmonic array according to claim 5, wherein the first distance and the second distance are different.

7. The electro-plasmonic array according to claim 1, wherein the conductive nanodisks are formed from a conductive material selected from the group consisting of graphene, gold, silver, aluminum, copper, titanium, magnesium, palladium, and zirconium.

8. The electro-plasmonic array according to claim 7, wherein the electrochromic polymer layer is selected from the group consisting of poly(3,4-ethylenedioxythiophene): polystyrene sulfonate, polypyrrole, polyaniline, and poly(3, 4-propylenedioxythiophene).

9. The electro-plasmonic array according to claim 8, wherein the electrochromic polymer layer has a thickness from about 10 nm to about 50 nm.

10. The electro-plasmonic array according to claim 1, wherein the conductive nanodisks have a thickness from about 10 nm to about 100 nm and a lateral dimension from about 50 nm to about 200 nm.

11. A method of forming an electro-plasmonic array, the method comprising:
depositing a photoresist layer on a substrate;
patterning the photoresist layer to form a two-dimensional matrix pattern;
depositing a conductive layer over the patterned photoresist layer;
removing the photoresist layer thereby retaining a plurality of conductive nanodisks disposed on a surface of the substrate; and
depositing a conforming biocompatible electrochromic polymer layer over the plurality of conductive nanodisks thereby forming a plurality of nanoantennas.

12. The method according to claim 11, wherein the substrate is formed from glass and includes a conductive coating.

13. The method according to claim 12, wherein the conductive coating is an indium tin oxide coating.

14. The method according to claim 11, wherein the plurality of nanoantennas are disposed in a two-dimensional matrix pattern with a periodicity of about 500 nm.

15. The method according to claim 11, wherein the plurality of nanoantennas are disposed in a two-dimensional matrix pattern wherein a first distance between the nanoantennas is from about 100 nm to 1000 nm and a second distance is from about 100 nm to about 1000 nm.

16. The method according to claim 15, wherein the first distance and the second distance are different.

17. The method according to claim 11, wherein the conductive nanodisks are formed from a conductive material selected from the group consisting of graphene, gold, silver, aluminum, copper, titanium, magnesium, palladium, and zirconium.

18. The method according to claim 17, wherein the electrochromic polymer layer is selected from the group consisting of poly(3,4-ethylenedioxythiophene): polystyrene sulfonate, polypyrrole, polyaniline, and poly(3,4-propylenedioxythiophene).

19. The method according to claim 18, wherein the electrochromic polymer layer has a thickness from about 10 nm to about 50 nm.

20. The method according to claim 11, wherein the conductive nanodisks have a thickness from about 10 nm to about 100 nm and a lateral dimension from about 50 nm to about 200 nm.

* * * * *